(12) United States Patent
Armstrong et al.

(10) Patent No.: US 10,243,355 B2
(45) Date of Patent: Mar. 26, 2019

(54) FAULT IDENTIFICATION AND ISOLATION IN AN ELECTRIC PROPULSION SYSTEM

(71) Applicants: Rolls-Royce North American Technologies, Inc., Indianapolis, IN (US); Rolls-Royce Corporation, Indianapolis, IN (US)

(72) Inventors: Michael James Armstrong, Avon, IN (US); Andrew Mark Bollman, Plainfield, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 101 days.

(21) Appl. No.: 15/173,947

(22) Filed: Jun. 6, 2016

(65) Prior Publication Data

US 2016/0365722 A1    Dec. 15, 2016

Related U.S. Application Data

(60) Provisional application No. 62/173,673, filed on Jun. 10, 2015.

(51) Int. Cl.
*H02H 7/30* (2006.01)
*H02H 7/26* (2006.01)
(Continued)

(52) U.S. Cl.
CPC .......... *H02H 7/267* (2013.01); *B60L 3/0069* (2013.01); *B60L 3/0092* (2013.01); *B60L 11/08* (2013.01);
(Continued)

(58) Field of Classification Search
USPC ...................................... 361/62–69
See application file for complete search history.

(56) References Cited

U.S. PATENT DOCUMENTS 7,123,462 B2   10/2006   Uekawa
7,468,587 B2   12/2008   Shkondin
(Continued)

FOREIGN PATENT DOCUMENTS

CN    1405572 A    3/2003
CN    104380554 A   2/2015
(Continued)

OTHER PUBLICATIONS

Berg et al., "HTS Electrical System for a Distributed Propulsion Aircraft," IEEE Transactions on Applied Superconductivity, vol. 25, No. 3, Jun. 2015, 5 pp.
(Continued)

*Primary Examiner* — Danny Nguyen
(74) *Attorney, Agent, or Firm* — Shumaker & Sieffert, P.A.

(57) ABSTRACT

An electric propulsion system is described that includes at least one branch for distributing electrical power, provided by a power source, to one or more loads. The at least one branch is partitioned into one or more zones and comprises a plurality of branch isolation devices that are configured to isolate the at least one branch from the power source in response to a fault current at the at least one branch. In addition, the at least one branch comprises a respective pair of zone isolation devices for each respective zone from the one or more zones. The respective pair of zone isolation devices for each respective zone is configured to isolate the respective zone from the at least one branch, during a test of the at least one branch for identifying which of the one or more zones is a source of the fault current.

19 Claims, 4 Drawing Sheets

(51) Int. Cl.

| | | |
|---|---|---|
| *B60L 3/00* | (2019.01) | |
| *H02H 1/00* | (2006.01) | |
| *H02H 1/06* | (2006.01) | |
| *H02H 3/00* | (2006.01) | |
| *H02H 3/02* | (2006.01) | |
| *B60L 11/08* | (2006.01) | |
| *B63H 23/24* | (2006.01) | |
| *B63H 23/28* | (2006.01) | |
| *B64D 27/24* | (2006.01) | |

(52) U.S. Cl.
CPC ............ *B63H 23/24* (2013.01); *B63H 23/28* (2013.01); *B64D 27/24* (2013.01); *H02H 1/003* (2013.01); *H02H 1/06* (2013.01); *H02H 3/00* (2013.01); *H02H 3/021* (2013.01); *B60L 2200/10* (2013.01); *B60L 2200/32* (2013.01); *B60L 2220/42* (2013.01); *B60L 2240/429* (2013.01); *B60L 2240/529* (2013.01); *B60L 2240/549* (2013.01); *B64D 2221/00* (2013.01); *Y02T 10/646* (2013.01); *Y02T 10/70* (2013.01); *Y02T 10/7077* (2013.01); *Y02T 50/62* (2013.01)

(56) References Cited

U.S. PATENT DOCUMENTS

| | | | |
|---|---|---|---|
| 7,555,893 B2 | 7/2009 | Okai et al. | |
| 8,035,357 B2 | 10/2011 | Patterson et al. | |
| 8,469,306 B2 | 6/2013 | Kuhn, Jr. | |
| 8,727,271 B2 | 5/2014 | Salyer | |
| 2003/0086228 A1* | 5/2003 | Papallo, Jr. .......... | H01H 71/123 361/93.1 |
| 2008/0225452 A1 | 9/2008 | Stoupis et al. | |
| 2011/0102958 A1* | 5/2011 | Meehleder ............ | H02H 1/06 361/93.1 |
| 2011/0172840 A1* | 7/2011 | Narel .................... | H02H 1/043 700/292 |
| 2013/0126669 A1 | 5/2013 | Hamann et al. | |
| 2013/0286521 A1* | 10/2013 | Park ...................... | H02H 3/066 361/57 |

FOREIGN PATENT DOCUMENTS

| | | |
|---|---|---|
| CN | 105021950 A | 11/2015 |
| DE | 19855245 A1 | 6/1999 |
| DE | 10213732 A1 | 10/2003 |
| DE | 10251589 A1 | 5/2004 |
| DE | 10317362 A1 | 11/2004 |
| DE | 102005004330 A1 | 8/2006 |
| DE | 102005005236 A1 | 8/2006 |
| DE | 102008010979 A1 | 8/2009 |
| EP | 1044851 A2 | 10/2000 |
| EP | 1478072 A2 | 11/2004 |
| EP | 1940000 A2 | 7/2008 |
| EP | 2575230 A2 | 4/2013 |
| EP | 2581308 A2 | 4/2013 |
| EP | 2860838 A1 | 4/2015 |
| WO | 2009127817 A1 | 10/2009 |

OTHER PUBLICATIONS

Ross et al., "Turboelectric Distributed Propulsion System Design Trades," SAE Technical Paper 2014-01-2141, Sep. 16, 2014, 13 pp.
Examination Report from counterpart European Application No. 16173102.1, dated Nov. 21, 2017, 8 pp.
K Jia et al., "Advanced DC Zonal Marine Power System Protection," IET Generation, Transmission, and Distribution, vol. 8, Issue 2, Feb. 2014, pp. 301-309.
Parker et al., "UK Marine Systems Development Office—Future Surface Ship Integrated Power System: A Vision of the Future?," Defence Equipment & Support: Future Business Group—Marine Systems Development, 2008 ( (Applicant points out, in accordance with MPEP 609.04(a), that the year of publication, 2008, is sufficiently earlier than the effective U.S. filing date, Jun. 10, 2015, so that the particular month of publication is not in issue.) 14 pp. Copyright 2008.
Search Report from counterpart European Application No. 16173102.1, dated Oct. 18, 2016, 13 pp.
Summons to Attend Oral Proceedings Pursuant to Rule 115(1) EPC from counterpart European application No. 16173102.1, dated Jul. 16, 2018, 11 pgs.
Response to Examination Report dated Nov. 21, 2017, from counterpart European Application No. 16173102.1, filed Mar. 26, 2018, 11 pp.
First Office Action and Search Report, and translation thereof, from counterpart Chinese Application No. 201610646832.X, dated Nov. 5, 2018, 21 pp.

* cited by examiner

FAULT IDENTIFICATION AND ISOLATION IN AN ELECTRIC PROPULSION SYSTEM

This application claims the benefit of U.S. Provisional Application No. 62/173,673 filed Jun. 10, 2015, the entire content of which is hereby incorporated by reference.

BACKGROUND

Some electric propulsion systems, such as turbo electric distributed propulsion (TeDP) systems found on some aircraft or marine craft, may rely on large and expensive, fault interruption and isolation equipment to interrupt fault currents, and isolate individual branches of the system that carry the fault currents, as a way to prevent the fault currents from damaging the system. Still some electric propulsion systems may include specialized converters that use fold-back control techniques or other techniques to limit fault currents without actually locating and isolating the source of the fault, to one particular branch.

While these types of systems may succeed in preventing fault currents from damaging the overall system, electric propulsion systems employing this protection technique may be unable to trace the source of a fault current down to an individual segment, component, or other specific location, within a particular branch. Accordingly, even if only a small portion of a branch is faulty, some electric propulsion systems will isolate an entire branch to prevent a fault current from damaging the system. Electric propulsion systems employing this technique may strain other branches of the system to compensate for a downed branch, even if at least some of the downed branch remains usable.

SUMMARY

In one example, the disclosure is directed to an electric propulsion system that includes one or more loads, at least one power source that provides electrical power to the one or more loads, and at least one branch that distributes the electrical power provided by the at least one power source, to each of the one or more loads. The at least one branch is partitioned into one or more zones and the at least one branch includes a plurality of branch isolation devices that are configured to isolate the at least one branch from the at least one power source in response to a fault current at the at least one branch. The at least one branch further includes a respective pair of zone isolation devices for each respective zone from the one or more zones, wherein the respective pair of zone isolation devices for each respective zone is configured to isolate the respective zone from the at least one branch, during a test of the at least one branch for identifying which of the one or more zones is a source of the fault current.

In another example, the disclosure is directed to a method that includes detecting a fault current at a branch of an electric propulsion system, and responsive to detecting the fault current, isolating the branch from a power source that supplies electrical power, via the branch, to one or more loads. The method further includes, while the branch is isolated from the power source, identifying one or more faulty zones of the branch as being a source of the fault current, and isolating each of the one or more faulty zones from the branch. The method further includes while continuing to isolate each of the one or more faulty zones from the branch, distributing, via one or more non-faulty zones of the branch, the electrical power to at least one of the one or more loads.

In one example, the disclosure is directed to a system that includes means for detecting a fault current at a branch of the system, means for isolating the branch from a power source that supplies electrical power, via the branch, to one or more loads in response to detecting the fault current, as well as means for identifying one or more faulty zones of the branch as being a source of the fault current, while the branch is isolated from the power source. The system further includes means for isolating each of the one or more faulty zones from the branch, and means for distributing, via one or more non-faulty zones of the branch, the electrical power to at least one of the one or more loads, while continuing to isolate each of the one or more faulty zones from the branch.

The details of one or more examples are set forth in the accompanying drawings and the description below. Other features, objects, and advantages of the disclosure will be apparent from the description and drawings, and from the claims.

DETAILED DESCRIPTION

In general, techniques and circuits of this disclosure may enable an electric propulsion system, such as a turbo electric distributed power (TeDP) system on an aircraft or marine craft, to identify the location of a fault current, within a branch of the system, and isolate or otherwise disable that location of the branch, so that the electric propulsion system may resume operations using the remaining healthy or non-faulty parts of the branch. An example electric propulsion system may use broad, non-discriminative fault isolation equipment (referred to herein as "branch isolation devices") at the power sources and loads, to isolate a branch and prevent a fault current from damaging the system. In some examples, rather than rely on the use of such broad, non-discriminative fault isolation devices, the example electric propulsion system may use fold-back control techniques to drop the voltage, and thereby reduce the current, at the branch to prevent a fault current from damaging the system.

In any case, unlike other electric propulsion systems, after interrupting a fault current and isolating an entire branch using the branch isolation devices or fold-back control techniques, the example electric propulsion system uses much smaller interrupters, referred to herein as "zone isolation devices", to test the branch and isolate the fault to one or more "zones" (e.g., segments or locations) within the branch.

For example, to identify the faulty zone(s) of a branch, the example system may apply a test signal, such as a low level voltage or current, from a stored energy source to each of the zones of the branch while the branch is isolated from the power source and loads. The test signal may enable the system to individually test each of the zones for anomalies that may indicate whether the zone is a source of the fault current within the branch. In response to identifying one or more zones that fail the test, so-called "faulty zones", the electric propulsion system may configure the zone isolation devices to continue isolating the faulty zones, while bringing the rest of the branch (i.e., the non-faulty zones) that is unaffected by the fault, back online.

Figure 1:
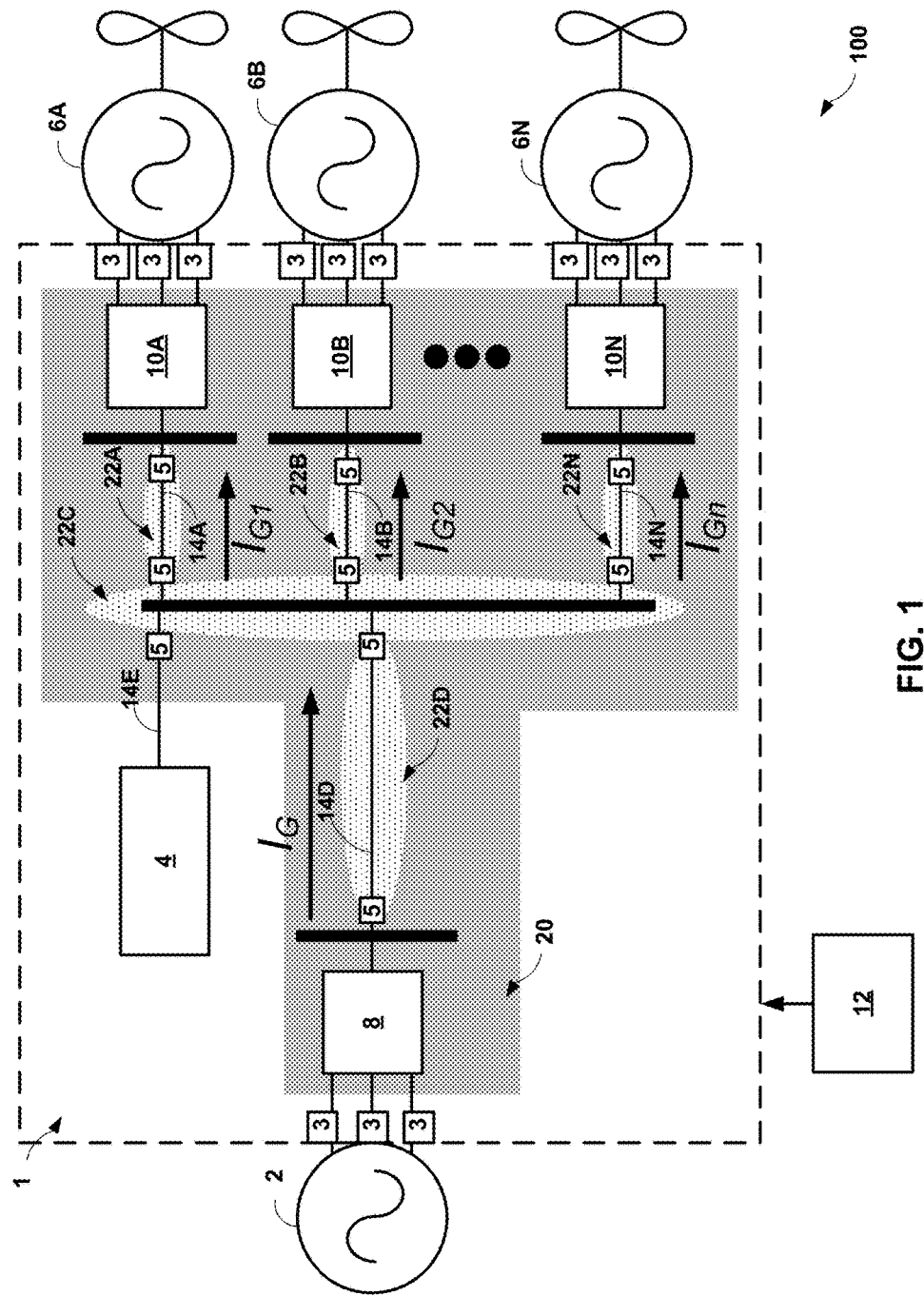
FIG. 1 is a conceptual diagram illustrating a branch of an example electric propulsion system configured to distribute electrical power from a source to one or more loads, in accordance with one or more aspects of the present disclosure.

FIG. 1 is a conceptual diagram illustrating branch 1 of electric propulsion system 100 which is configured to distribute electrical power from source 2 to one or more loads 6A-6N (collectively "loads 6"), in accordance with one or more aspects of the present disclosure. In one example, system 100 comprises part or all of a turbo electric distributed propulsion (TeDP) system on board an aircraft or a marine craft.

In general, system 100 can be any other power system that can achieve its operating requirements for distributing power from a source to one or more loads despite occasionally being down (e.g., for up to one to three seconds of time for aviation applications or even longer periods of time for marine applications), while system 100 tests branch 1 to identify the location(s) within branch 1 that are the source of a fault current, in accordance with one or more aspects of the present disclosure. In other words, while some systems require seemingly zero loss of power to the system loads, system 100 could be any example system that can afford a temporary loss of support for the system loads.

For example, while system 100 may be suitable for propulsion type applications, system 100 may not be as suitable for other applications that require a shorter amount of down-time to test for faults. For a TeDP application in an aircraft, momentary loss of thrust power is acceptable so long as the duration of that loss does not result in a sustained loss of thrust. The inertia of the propellers and the flight condition will govern the allowable power lapse duration (e.g., generally on the order of seconds or tenths of seconds for aviation applications or even longer periods of time for marine applications, but typically not micro or milliseconds). As is the case, unlike communication systems for example, some TeDP systems are reconfigurable and can afford to have a branch to be temporarily taken out of service and power re-routed to the loads using a redundant power network.

System 100 includes power source 2, loads 6, control unit 12, and branch 1. Power source 2 provides electrical power, via branch 1, to loads 6. Power source 2 represents any high voltage or high current power source for use in an electric propulsion system such as system 100. Although shown as being an AC power source, power source 2 could also be a DC power source.

Loads 6 represent any type of load for receiving electrical power provided by an electric propulsion system. Loads 6 are shown in FIG. 1 as being propulsion motors for an aircraft or marine craft. In other words, in a TeDP application, loads 6 represent the one or more electrical propulsion units that provide propulsion to the host aircraft or marine craft, based on the electrical power provided, via branch 1, by power source 2.

For the sake of brevity and clarity, control unit 12 is shown as, generally, being operatively coupled to all of the components of branch 1. Although not specifically shown in FIG. 1, control unit 12 may also be operatively coupled to power source 2 and loads 6. In other words, control unit 12 may provide and/or receive, signals and information, to and/or from each of the different components of system 100, including branch 1, source 2, and loads 6, so as to configure branch 1 to distribute, and refrain from distributing, power from source 2 to loads 6. In addition, although control unit 12 is described below for the sake of brevity as primarily controlling the components of system 100 and branch 1 for performing the techniques described herein, in some examples, converters 8 and 10 may include additional functionality for performing some or all of the operations described below with respect to control unit 12. For example, one or more of converters 8 and 10 may include means for detecting a fault current at a branch of an electric propulsion system, isolating the branch from a power source that supplies electrical power, via the branch, to one or more loads, identifying one or more faulty zones of the branch as being a source of the fault current, isolating each of the one or more faulty zones from the branch, and distributing, via one or more non-faulty zones of the branch, the electrical power to at least one of the one or more loads.

Control unit 12 may comprise any suitable arrangement of hardware, software, firmware, or any combination thereof, to perform the techniques attributed to control unit 12 herein. Examples of control unit 12 include any one or more microprocessors, digital signal processors (DSPs), application specific integrated circuits (ASICs), field programmable gate arrays (FPGAs), or any other equivalent integrated or discrete logic circuitry, as well as any combinations of such components. When control unit 12 includes software or firmware, control unit 12 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, control unit 12 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to control unit 12 (e.g., may be external to a package in which control unit 12 is housed).

In some examples, branch 1 is part of a DC distribution system and branch 1 includes converters 8 and converters 10A-10N (collectively "converters 10") as examples of power converters that alter the voltage or current level associated with the electrical power provided by power source 2, before and after the electrical power travels, via branch 1, to loads 6. For example, converter 8 may be an AC to DC converter or DC to DC converter that steps the voltage or current level of the electrical power provided by power source 2, from a first level, down to a more manageable second level, for distribution through branch 1. Conversely, converters 10 may each be DC to DC or DC to AC converters that step the voltage or current level of the electrical power provided by power source 2, from the second level, back up to the first level, for driving loads 6. In some examples, branch 1 is part of an AC distribution system and therefore, omits converters 8 and 10 entirely from branch 1. For an AC distribution system, branch 1 may rely on branch isolation devices 3 for isolation.

Branch 1 includes multiple pairs of branch isolation devices 3 that are configured to interrupt a fault current at branch 1 and isolate branch 1 from power source 2 in response to a fault current at branch 1. Examples of branch isolation devices 3 include additional converters, breakers, or other generally large, heavy, and expensive isolation equipment that are rated to interrupt and hold-off a large, fault current, at a higher operating voltage associated with an electric propulsion system power source, such as power source 2. In some examples, rather than include branch isolation devices 3, converters 8 and 10 may perform fold-back control techniques to isolate branch 1 from power source 2 in the event of a fault current at branch 1. That is, converters 8 and 10 may perform fold-back control to reduce a voltage associated with branch 1 in response to a fault current. When using fold-back control, converters 8 and 10 may drop voltage at branch 1 as the current at branch 1 increases so that during a fault, the voltage at converters 8 and 10 may be at zero volts, in effect, thereby removing power from the branch.

While fold-back control may prevent damaging currents, fold-back control typically makes the task of locating the location of a fault in other systems more difficult, as now the voltage on the branch may be at zero. As is described below, the techniques of this disclosure enable the locating of a fault despite having zero volts at branch 1.

Branch 1 also includes multiple pairs of zone isolation devices 5 that are configured to partition branch 1 into one or more zones 22A-22N (collectively "zones 22") during a test for, and subsequent isolation of, faulty portions of branch 1. Said differently, system 100 uses a hierarchical zonal protection strategy for fault isolation. Whereas branch 1 represents a "protection zone" each of zones 22 represent individual "diagnostic" or "isolation" zones that system 100 may activate after first de-energizing the protection zone. Examples of zone isolation devices 5 include breakers, switches or other generally small, lightweight, and inexpensive isolation equipment that has a much lower rating for handling a lesser, operational voltage or current associated with branch 1 than branch isolation devices 3. In examples where branch 1 is part of an AC distribution system, zone isolation devices 5 may be of a reduced size as compared to the size of isolation devices 5 when branch 1 is part of a DC distribution system.

While branch isolation devices 3 are rated to handle the generally higher voltages and currents observed at the boundary locations of branch 1 (e.g., before converter 8 and after converters 10) so as to interrupt and isolate branch 1 from interrupt currents, zone isolation devices 5 are rated only to handle the typically lower voltages and currents observed internal to branch 1 (e.g., after converter 8 and before converters 10). As such, zone isolation devices 5 may generally be smaller in size, lighter in weight, less expensive, and less complex, than branch isolation devices 3.

For example, branch isolation devices 3 may have a first rating (e.g., voltage or current rating) that is sufficient to interrupt fault currents occurring at branch 1 and subsequently block an operating voltage at power source 2 during a test of branch 1 for faulty zones. Conversely, zone isolation devices 5 for each respective zone 22 may have a second rating that is less than the first rating of branch isolation devices 3. The second rating may be insufficient to interrupt fault currents or subsequently block the operating voltage at power source 2 during a test of branch 1 for faulty zones.

As will become clear with respect to the additional FIGS., zone isolation devices 5 may be configured to continue isolating a respective zone after a fault test if the respective zone is the source of the fault current. In addition, zone isolation devices 5 may be further configured to continue isolating a respective zone after branch isolation devices 3 restore the electrical power, from the power source 2, to branch 1 and to at least one of loads 6. Furthermore, zone isolation devices 5 may be configured to continue isolating a respective zone, after a fault test and in response to a voltage or current level at the respective zone, during the test, not satisfying a threshold voltage or threshold current that is indicative of a fault. That is, if the voltage or current level at a particular zone during a test of the particular zone is too high or too low, zone isolation devices 5 may continue to isolate that particular zone.

Each of zones 22 represents only a portion (e.g., one or more segments or components) of branch 1. Each of zones 22 includes a current path between a respective pair of zone isolation devices 5 for distributing at least a portion of the electrical power provided by power source 2, to other zones 22 of branch 1 and/or to loads 6. Branch 1 is configured to electrically couple power source 2 to at least one of loads 6 while at least one of zones 22 is isolated from branch 1. That is, in the event that system 100 determines that one or more of zones 22 is faulty and the source of a fault current, system 100 can disable the one or more faulty zones 22 while enabling the rest of branch 1 (i.e., the non-faulty zones 22) so that branch 1 can still provide at least some functionality despite the rest of branch 1 being isolated.

Branch 1 further includes secondary energy source 4 which is configured to provide a test signal to branch 1 to test whether any of zones 22 is the source of a fault current. In some examples, source 4 may be configured to support loads 6 in the event that power source 2 is faulted and isolated from branch 1. In addition, secondary energy source 4 may be used by branch 1 to stabilize By relying on secondary energy source 4 for energy to perform a test of branch 1 during a fault, system 100 may be able to detect the fault location using low power rather than traditional protection methods that may be too slow for a small medium-voltage (MV) DC system or a superconducting system.

In some examples, secondary energy source 4 is an energy storage device that is separate from power source 2 and other components of branch 1. For example, secondary energy source 4 may be a capacitor, a battery, or other storage device that provides minimal energy needed to perform a fault isolation test of zones 22. In some examples, secondary energy source 4 is part of a branch, other than branch 1, of system 100. In some examples, each of the branches of system 100 includes its own shared energy source 4, or multiple energy sources 4, one for each zone.

In other examples, secondary energy source 4 is one or more of zone isolation devices 5 that retain at least a portion of the electrical power that remains at branch 1 after system 100 isolates branch 1 from the power source 2 and during the test. In other words, in some examples, zone isolation devices 5 serve a dual purpose: zone isolation devices isolate each of zones 22 during and after a test, and provide the energy associated with a test signal applied to zones 22 during the test.

Secondary energy source 4 may provide a test signal that has a voltage or current level that is less than a voltage or current level associated with the electrical power provided by power source 2. For instance, whereas power source 2 may provide a voltage with a magnitude on the order of tens, hundreds or even thousands of volts, energy source 4 may provide only a fraction of the voltage provided by power source 2, for instance, on the order of a single or fraction of a volt.

In normal operation (i.e., when no fault currents are currently present at branch 1), power source 2 may provide power, via branch 1, to loads 6. As power source 2 provides electrical power to loads 6, FIG. 1 shows the current $I_G$ attributed to the electrical power provided by power source 2, after being down converted by converter 8, as the current $I_G$ travels via segment 14D and through zone 22D. After the current $I_G$ passes through zone 22C, the current $I_G$ is split according to Kirchoff's Law, into currents $I_{G1}$, $I_{G2}$, and $I_{GN}$. Currents $I_{G1}$, $I_{G2}$, and $I_{GN}$ travel, respectively, via links 14A, 14B, and 14N, through zones 22A, 22B, and 22N.

Eventually, currents $I_{G1}$, $I_{G2}$, and $I_{GN}$ reach converters 10, where currents $I_{G1}$, $I_{G2}$, and $I_{GN}$ are stepped up for powering loads 6. Eventually, a fault current may appear at branch 1. Control unit 12 may detect the fault current and initiate operations for identifying the location (e.g., one of zones 22), within branch 1, of the fault current and for isolating that location, within the branch, from the rest of the branch, so that electric propulsion system 100 may resume operations using the healthy, non-faulty parts of the branch. For example, control unit 12 may receive information from branch isolation devices 3 that indicate when branch isolation devices 3 have been triggered by a fault current. In other examples, control unit 12 may include voltage and current monitoring features that provide information from control unit 12 as to the current level or levels at various parts of branch 1. In response to control unit 12 determining that a current level at branch 1 exceeds a maximum current threshold that is indicative of a fault current and determine that a fault current exists at branch 1.

Responsive to detecting the fault current, branch isolation devices 3 may either automatically, or based on a command from control unit 12, isolate branch 1 from power source 2 while power source 2 supplies electrical power, via branch 1, to loads 6. For example, branch isolation devices 3 may be breakers that automatically cause an open circuit between branch 1 and power source 2 and loads 6 if the current $I_G$ exceeds a triggering threshold. In this way, branch 1 is immediately isolated from other branches or components of system 100 so that the fault current associated with branch 1 is prevented from damaging the other branches or components of system 100.

Figure 2:
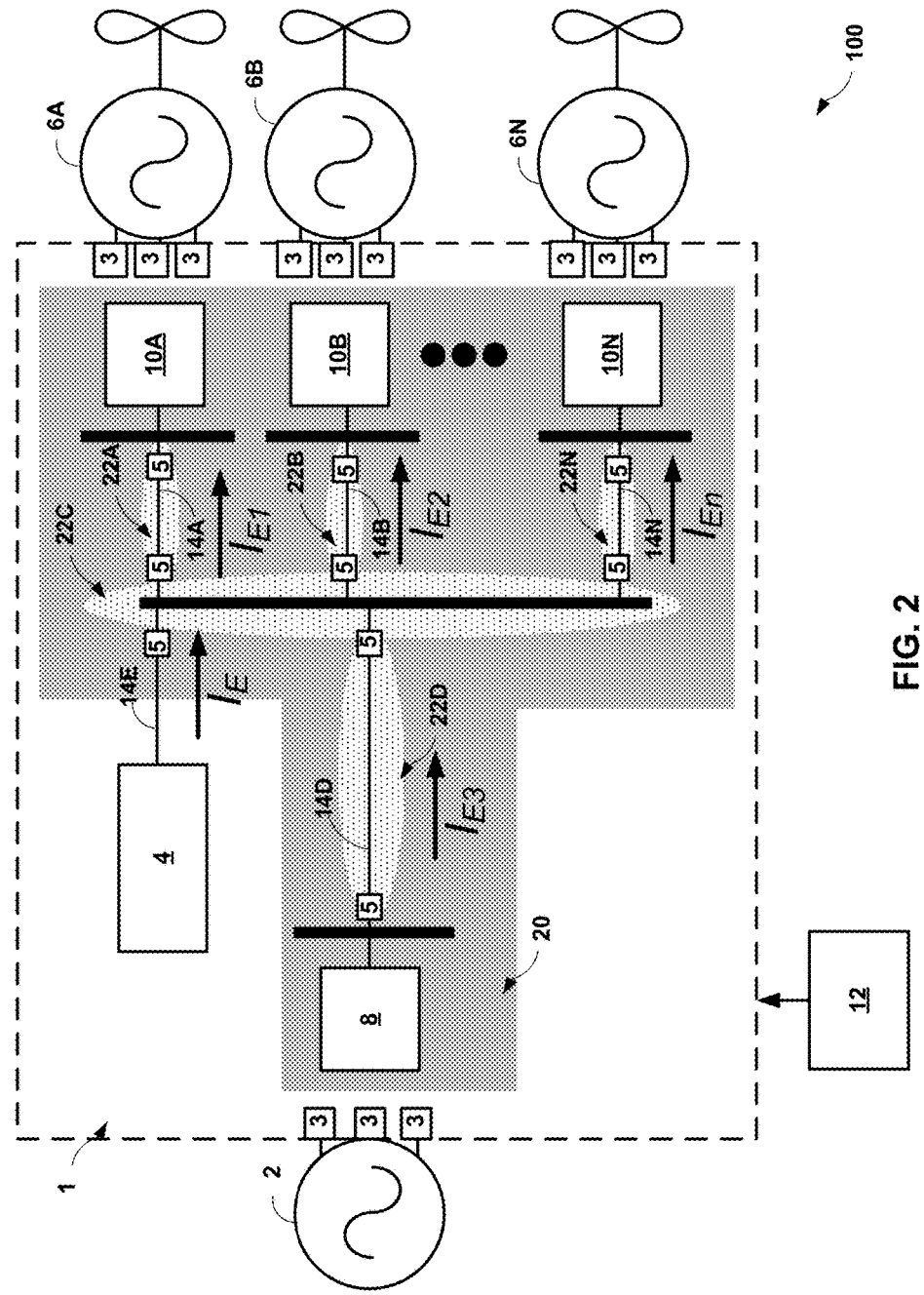
FIG. 2 is a conceptual diagram illustrating the branch of the example electric propulsion system of FIG. 1, while the example electric propulsion system performs a fault test of the branch, in accordance with one or more aspects of the present disclosure.

FIG. 2 is a conceptual diagram illustrating branch 1 of system 100 of FIG. 1, while system 100 performs a fault test of branch 1, in accordance with one or more aspects of the present disclosure. In other words, FIG. 2 is used to illustrate an example where system 100 locates the source of a fault current, below the branch level, after branch 1 is isolated, in response to a fault current, by branch isolation devices 3.

As shown in FIG. 2, branch 1 is isolated from power source 2 and loads 6. In some examples, isolating branch 1 from power source 2 and loads 6 may further include isolating branch 1 from converters 8 and 10. In some examples, "isolating branch 1 from power source 2 and loads 6" may imply that branch 1 continues to receive power from an alternative power source (e.g., separate from branch 1). Such alternative power sources may be distributed among zones 22 or may be provided by power source 2 or secondary energy source 4. For example, in some examples, "isolating branch 1 from power source 2 and loads 6" may imply that branch 1 still receives power from power source 2, only the power received from power source 2 "while isolated" may be at a lower operating voltage and/or current than when branch 1 is not isolated from power source 2. In any case, while branch 1 is isolated from power source 2, control unit 12 may identify one or more faulty zones 22 of branch 1 as being a source of the fault current detected in FIG. 1.

Control unit 12 may identify the one or more faulty zones 22 of branch 1 as being the source of the fault current by first applying a test signal to branch 1, and after applying a test signal to the branch, determining a voltage or current level at each of the one or more zones 22. For example, control unit 12 may enable secondary energy source 4 to apply the test signal (e.g., via link 14E) to branch 1.

As shown in FIG. 2, during a test of branch 1, the current $I_G$ is no longer distributed through branch 1 and on to loads 6. Instead, current $I_E$, associated with the test signal, travels via link 14E to branch 1 and is distributed out to zones 22 as currents $I_{E1}$-$I_{En}$.

In some examples, the test signal may be derived from stored energy associated with one or more of zone isolation devices 5 and/or converter 8. For example, upon isolation by branch isolation devices 3, control unit 12 may cause each of zone isolation devices 5 to isolate their respective zones 22. Then, control unit 12 may configure each respective pair of zone isolation devices 5 to sequentially apply a test signal across the respective zone 22. For instance, control unit 12 may configure the pair of zone isolation devices 5 that bout zone 22D to release their respective stored energy and apply current $I_{E3}$ across link 14D. In some examples, control unit 12 may configure converter 8 to sequentially apply a similar test signal across the respective zones 22.

In some examples, at least a portion of the functionality of control unit 12 along with secondary energy source 4 may be packaged as a single module (e.g., for each zone 22). Then, such a module that includes a portion of the functionality of control unit 12 along with secondary energy source 4 may sequentially apply a similar test signal across each of the respective zones 22

Control unit 12 may measure the voltage across each of zones 22 and/or current through each of zones 22 so as to identify the one or more faulty zones 22 of branch 1 as being the source of the fault current. Responsive to determining that the voltage or current level satisfies a threshold, control unit 12 may determine that a particular zone is not the source of the fault, whereas responsive to determining that the voltage or current level does not satisfy the threshold, control unit 12 may determine that the particular zone is the source of the fault.

For example, if zone 22D is a transmission line, and not the source of a fault current, control unit 12 may determine that the voltage across zone 22D is zero volts or some other near zero threshold value. However, control unit 12 may identify zone 22D as being the source of the fault in response to determining that the voltage across zone 22 is non-zero (i.e., greater than or less than zero) or otherwise does not satisfy the threshold.

In the example of FIG. 2, control unit 12 may determine that the voltage associated with zone 22B does not satisfy a threshold and determine that zone 22B is the source of the fault current that triggered the isolation of branch 1 and as such, is a faulty zone. Control unit 12 may isolate each of the one or more faulty zones 22 from branch 1 and refrain from isolating each of the one or more non-faulty zones 22 of branch 1.

Figure 3:
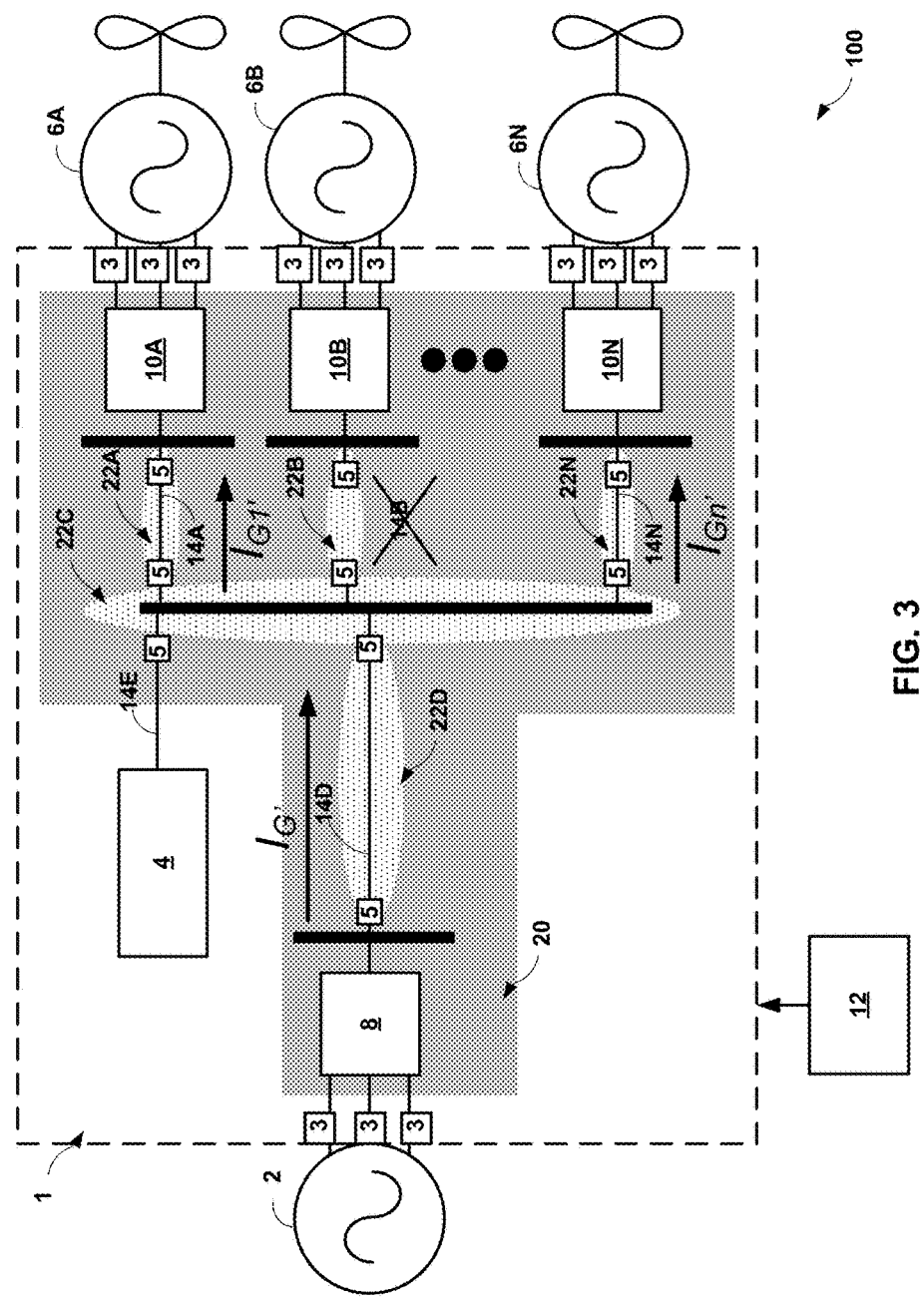
FIG. 3 is a conceptual diagram illustrating the branch of the example electric propulsion system of FIG. 1, after the example electric propulsion system performs a fault test of the branch, in accordance with one or more aspects of the present disclosure.

FIG. 3 is a conceptual diagram illustrating branch 1 of electric propulsion system 100 of FIG. 1 after system 100 performs a fault test of branch 1, in accordance with one or more aspects of the present disclosure. For example, FIG. 3 shows an example where system 100 has isolated the source of a fault current, below the branch level, and after isolating the source of the fault, within branch 1, system 100 resumes operations providing electrical power from source 2 to loads 6, using the remaining "healthy" or otherwise non-faulty portions of branch 1.

For example, in response to determining that only zone 22B is faulty, control unit 12 may configure zone isolation devices 5 to prevent currents from traveling via link 14B through zone 22B and may configure zone isolation devices 5 to enable currents to travel via the other links 14A, 14C, and 14D-14N associated with zones 22A and 22C-22N. While continuing to isolate each of the one or more faulty zones 22 from branch 1 (e.g., zone 22B), control unit 12 may configure system 100 to resume distributing, via one or more non-faulty zones of the branch (e.g., zones 22A and 22C-22N), the electrical power to at least one of loads 6. In this way, only load 6B is prevented from receiving electrical power via branch 1, whereas source 2 can continue to rely on branch 1 to provide electrical power to loads 6A and 6N.

Accordingly, a system in accordance with the techniques described herein may balance the load demand between different branches of the system. An example system can quickly locate a fault and restore a healthy part of a faulty branch rather than removing an entire branch (e.g., for the duration of a flight).

Figure 4:
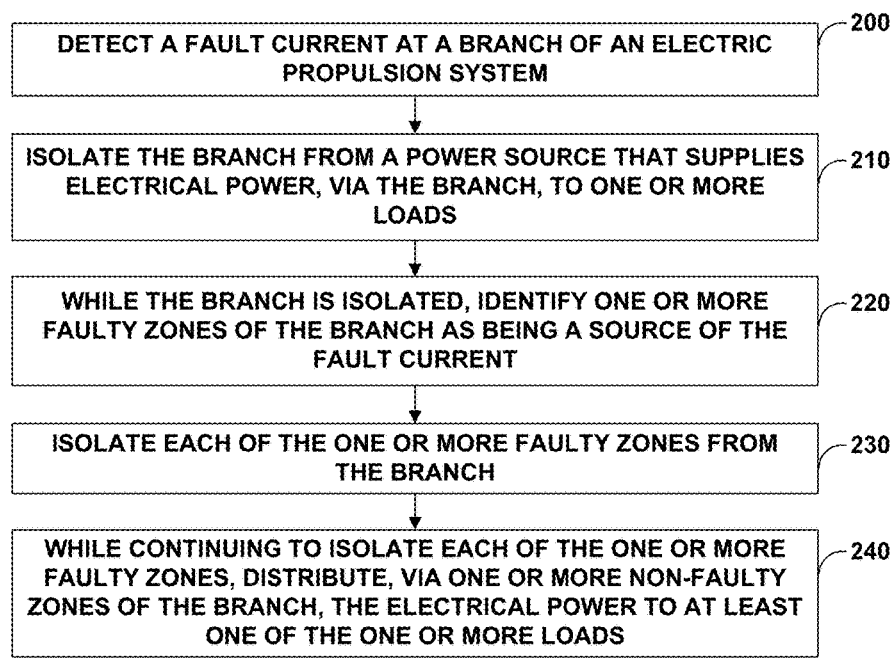
FIG. 4 is a flow chart illustrating example operations performed by a controller of the example electric propulsion system of FIGS. 1-3, in accordance with one or more aspects of the present disclosure.

FIG. 4 is a flow chart illustrating example operations 200-240 being performed by control unit 12 of electric propulsion system 100 of FIGS. 1-3, in accordance with one or more aspects of the present disclosure. FIG. 4 is described below within the context of system 100 and control unit 12 of FIGS. 1-3.

For example, control unit 12 may be a controller, a processor, or other type of module configured to execute instructions for performing operations 200-240. In some examples, control unit 12 may comprise non-transitory computer readable storage medium that, when executed by control unit 12, configures control unit 12 to perform operations 200-240. And in some examples, control unit 12 includes data acquisition components and other instrumentation that is configured to measure voltages and currents at branch 1 for determining whether there is a fault at branch 1.

System 100 may detect a fault current at a branch of an electric propulsion system (200). For example control unit 12 and/or branch isolation devices 3 may determine that a current $I_G$ traveling through branch 1 exceeds a current threshold that indicates system 100 is at risk of being damaged.

System 100 may isolate the branch from the power source that supplies electrical power, via the branch, to one or more loads (210). For example, control unit 12 may configure branch isolation devices 3 so that branch isolation devices 3 trigger in response to the fault current, causing branch 1 to be electrically isolated from power source 2 and/or loads 6.

While the branch is isolated, system 100 may identify one or more faulty zones of the branch as being a source of the fault current (220). For example, while branch 1 is isolated by branch isolation devices 3, control unit 12 may enable secondary energy source 4 to trickle power through each of zones 22. In some examples, control unit 12 may cause zone isolation devices 5 operate so that a small current $I_G$ from secondary energy source 4 is applied to each of zones 22 sequentially, one at a time, and/or all at once.

Using a separate energy storage device as secondary energy source 4, energy from another branch as secondary energy source 4, or stored energy in zone isolation devices 5 as secondary energy source 4, system 100 can test each zone 22 for a fault or failure. If system 100 determines that a zone is healthy (e.g., the voltage drop across the zone is zero), system 100 can restore power to that zone 22 of branch 1. In some examples, if zone isolation devices 5 are used as secondary energy source 4, system 100 may check for faults in each of zones 22 simultaneously. In some examples, if a separate energy storage device as secondary energy source 4 or energy from another branch is used as secondary energy source 4, system 100 may perform a check of each of zones 22 sequentially.

In any case, control unit 12 may measure the voltage across each of zones 22 as at least a portion of the current $I_G$ reaches that zone to determine whether the voltage satisfies a voltage threshold (e.g., zero volts). If the voltage across any of zones 22 does not satisfy the voltage threshold, control unit 12 may flag those zones as being faulty zones, and as potentially being the source of the fault current.

System 100 may isolate each of the one or more faulty zones from the branch (230). For instance, control unit 12 may configure zone isolation devices 5 to electrically isolate each of the one or more faulty zones 22 identified during the test and conversely, configure zone isolation devices 5 to maintain electrical connections between branch 1 and each of the one or more non-faulty zones 22 (e.g., all the zones other than the faulty zones) identified during the test.

While continuing to isolate each of the one or more faulty zones, system 100 may distribute, via one or more non-faulty zones of the branch, the electrical power to at least one of the one or more loads (240). For instance, control unit 12 may configure branch isolation devices 3 to refrain from isolating branch 1 and re-couple branch 1 with power source 2 and loads 6. As branch 1 comes back on-line and receives power from power source 2 for distribution to loads 6, branch isolation devices 5 may maintain electrical isolation of the faulty zones 22 of branch 1 while enabling each of the one or more non-faulty zones 22 (e.g., all the zones other than the faulty zones) identified during the test to conduct the electrical power for loads 6.

As such, even though system 100 may determine that a portion of branch 1 is faulty and therefore inhibited from distributing power to loads 6, system 100 can still rely on the healthy, non-faulty parts of branch 1 to provide at least some power distribution capability to loads 6. Unlike other electric propulsion systems, system 100 can reconfigure a branch in response to a fault current to isolate the faulty portions, and continue to rely on the remaining healthy portions of the branch. As a result, even though system 100 may still have to rely on redundant branches to make up for the capability lost by the faulty branch, system 100 may not have to strain as hard as other electric propulsion systems, to compensate for a fault in the system. Accordingly, an electric propulsion system that operates in accordance with the above described techniques may be able to restore power to healthy parts of the system so as to reduce power generation burdens that the system may place on the other (redundant) branches that are responsible for supporting the loads when a branch goes down.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a processor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. An electric propulsion system comprising:
   one or more loads;
   at least one power source that provides electrical power to the one or more loads; and
   at least one branch that distributes the electrical power provided by the at least one power source, to each of the one or more loads, wherein the at least one branch is partitioned into one or more zones and the at least one branch comprises:
   a plurality of branch isolation devices that are configured to isolate the at least one branch from the at least one power source in response to a fault current at the at least one branch; and
   a respective pair of zone isolation devices for each respective zone from the one or more zones, wherein the respective pair of zone isolation devices for each respective zone is configured to isolate the respective zone from the at least one branch, during a test of the at least one branch for identifying which of the one or more zones is a source of the fault current,
   wherein the plurality of branch isolation devices has a first rating that is sufficient to interrupt the fault current and block an operating voltage at the at least one power source during the test and the respective pair of zone isolation devices for each respective zone has a second rating that is less than the first rating of the plurality of branch isolation devices.

2. The electric propulsion system of claim 1, wherein the respective pair of zone isolation devices is further configured to continue isolating the respective zone after the test if the respective zone is the source of the fault current.

3. The electric propulsion system of claim 2, wherein the respective pair of zone isolation devices is further configured to continue isolating the respective zone after the plurality of branch isolation devices restores the electrical power, from the at least one power source, to the at least one branch and to at least one of the one or more loads.

4. The electric propulsion system of claim 3, wherein the respective pair of zone isolation devices for each respective zone is further configured to continue isolating the respective zone after the test in response to a voltage or current level at the respective zone, during the test, not satisfying a threshold.

5. The electric propulsion system of claim 1, further comprising a secondary energy source that applies a test signal to the at least one branch during the test.

6. The electric propulsion system of claim 5, wherein a voltage or current level of the test signal is less than a voltage or current level associated with the electrical power provided by the at least one power source.

7. The electrical propulsion system of claim 5, wherein the secondary energy source comprises an energy storage device that is separate from the power source.

8. The electric propulsion system of claim 5, wherein the secondary energy source comprises one or more of the respective pairs of zone isolation devices.

9. The electric propulsion system of claim 1, wherein the at least one branch is configured to electrically couple the at least one power source to at least one of the one or more loads while at least one of the one or more zones is isolated from the at least one branch.

10. The electric propulsion system of claim 1, wherein each respective zone from the one or more zones comprises a current path between the respective pair of zone isolation devices for distributing at least a portion of the electrical power provided by the at least one power source to other zones of the at least one branch or to the one or more loads.

11. The electric propulsion system of claim 1, wherein the second rating is insufficient to interrupt the fault current or block the operating voltage at the at least one power source during the test.

12. The electric propulsion system of claim 1, wherein the one or more loads comprise one or more electrical propulsion units for providing propulsion based on the electrical power provided by the at least one power source.

13. The electric propulsion system of claim 12, wherein the plurality of branch isolation devices are configured to isolate the at least one branch from the at least one power source in response to the fault current by at least:
de-coupling the at least one branch from the at least one power source in response to the fault current; or
performing fold-back control to reduce a voltage associated with the at least one branch in response to the fault current.

14. A method comprising:
detecting a fault current at a branch of an electric propulsion system;
responsive to detecting the fault current, isolating the branch from a power source that supplies electrical power, via the branch, to one or more loads using a plurality of branch isolation devices;
while the branch is isolated from the power source, identifying one or more faulty zones of the branch as being a source of the fault current;
isolating each of the one or more faulty zones from the branch using a respective pair of zone isolation devices for each of the one or more faulty zones; and
while continuing to isolate each of the one or more faulty zones from the branch, distributing, via one or more non-faulty zones of the branch, the electrical power to at least one of the one or more loads,
wherein the plurality of branch isolation devices has a first rating that is sufficient to interrupt the fault current and block an operating voltage at the power source during the identifying one or more faulty zones of the branch as being the source of the fault current, and
wherein the respective pair of zone isolation devices for each respective zone has a second rating that is less than the first rating of the plurality of branch isolation devices.

15. The method of claim 14, wherein identifying the one or more faulty zones of the branch as being the source of the fault current comprises:
after applying a test signal to the branch, determining a voltage or current level at each of the one or more faulty zones; and
identifying the one or more faulty zones of the branch as being the source of the fault current in response to determining, during the test, that a voltage or current level at the one or more faulty zones does not satisfy a threshold.

16. The method of claim 15, wherein applying the test signal to the branch comprises enabling a secondary energy source to apply the test signal to the branch.

17. The method of claim 16, wherein the secondary energy source comprises an energy storage device that is separate from the power source or the secondary energy source comprises one or more zone isolation devices from the branch.

18. The method of claim 14, wherein isolating each of the one or more faulty zones from the branch comprises refraining from isolating each of the one or more non-faulty zones of the branch.

19. A system comprising:
means for detecting a fault current at a branch of the system;
means for isolating the branch from a power source that supplies electrical power, via the branch, to one or more loads in response to detecting the fault current;
means for identifying one or more faulty zones of the branch as being a source of the fault current, while the branch is isolated from the power source;
means for isolating each of the one or more faulty zones from the branch; and
means for distributing, via one or more non-faulty zones of the branch, the electrical power to at least one of the one or more loads, while continuing to isolate each of the one or more faulty zones from the branch,
wherein the means for isolating the branch from the power source comprises a plurality of branch isolation devices that have a first rating that is sufficient to interrupt the fault current and block an operating voltage at the power source during the identifying one or more faulty zones of the branch as being the source of the fault current, and
wherein the means for isolating each of the one or more faulty zones from the branch comprises a respective pair of zone isolation devices for each of the one or more faulty zones that have a second rating that is less than the first rating of the plurality of branch isolation devices.

* * * * *